L. N. GOOLEY.
VIBRATION REDUCER FOR SHAFT BEARINGS.
APPLICATION FILED MAY 16, 1908.
954,859.
Patented Apr. 12, 1910.
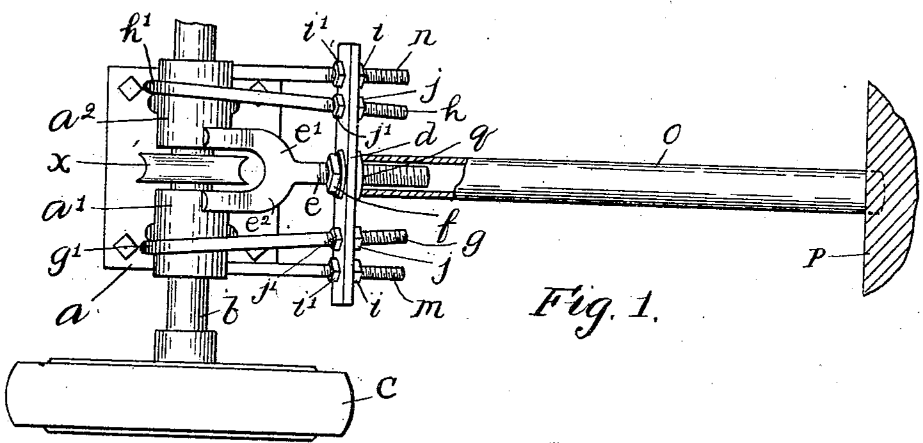
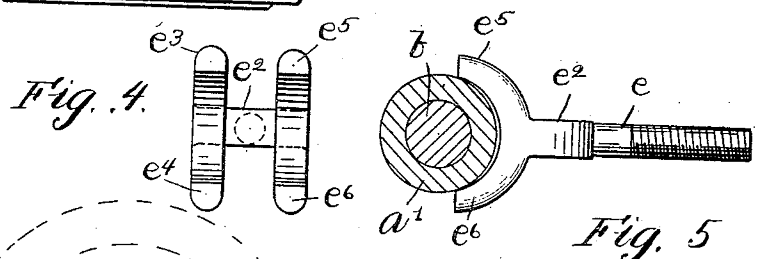
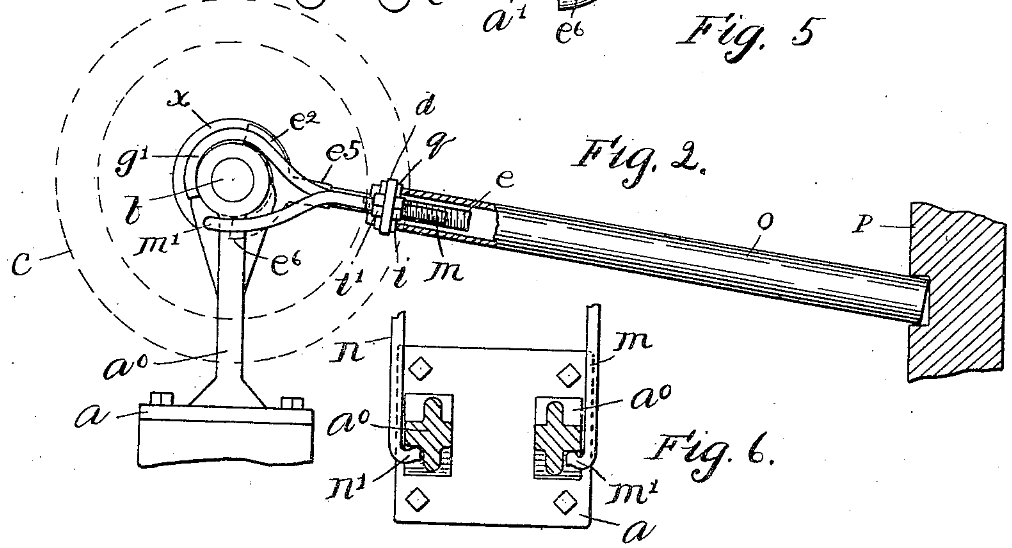
Witnesses:
H. B. Davis
Cynthia Doyle
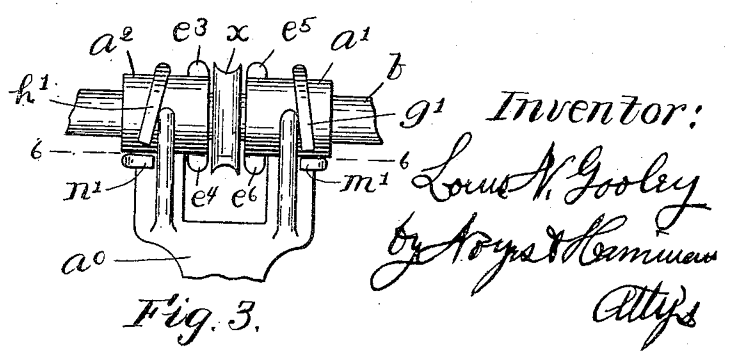
Inventor:
Louis N. Gooley
by Noyes & Harriman
Attys

UNITED STATES PATENT OFFICE.

LOUIS N. GOOLEY, OF HAVERHILL, MASSACHUSETTS.

VIBRATION-REDUCER FOR SHAFT-BEARINGS.

954,859. Specification of Letters Patent. Patented Apr. 12, 1910.

Application filed May 16, 1908. Serial No. 433,220.

*To all whom it may concern:*

Be it known that I, LOUIS N. GOOLEY, of Haverhill, county of Essex, State of Massachusetts, have invented an Improvement in Vibration-Reducers for Shaft-Bearings, of which the following is a specification.

With shafting which runs at very high speeds, such as is necessary in edge-trimming machines for shoes, and burnishing, grinding and polishing machines, there is often much shaft vibration. This vibration increases the difficulty with which the operator may perform his work, and, in many instances, prevents the production of satisfactory work. For example, in sole-trimming cutters the vibration often causes the cutter to chatter on the work, leaving an uneven surface. This vibration is not usually due to the loose fitting of a shaft in a bearing, except in a small degree, but rather is due to the manner in which the bearings are supported. It is, however, extremely difficult to mount the bearings of a high speed shaft in an ordinary factory building in such a manner as to prevent all vibration of the shaft.

This invention relates to a means for reducing shaft vibration and has for its object to provide an attachment which may be readily applied to any shaft bearing, and which will reduce or absorb the vibration of the shaft and bearing to such an extent that the shaft will run smooth and true.

I accomplish this object by the means shown in the accompanying drawing, in which, Figure 1 is a plan view of a shaft bearing provided with my invention. Fig. 2 is an end view thereof, partly in section. Fig. 3 is a front elevation. Fig. 4 is a detail front view of one of the bearing engaging members. Fig. 5 is an enlarged section on lines 5—5 of Fig. 1. Fig. 6 is a sectional plan view on the line 6—6 of Fig. 3.

In the drawing, $a$ indicates a journal bearing base mounted on a suitable support and provided with two uprights $a^0$ on which a pair of journal boxes $a'$, $a^2$, of the usual cylindrical form, are respectively supported, and in which a shaft $b$ is rotatably mounted, said shaft being shown as provided with a driving pulley $x$ between the boxes, and a grinding wheel $c$ at its end.

According to my invention I provide a connecting bar or support $d$, to which a series of bearing-engaging, vibration-receiving and transmitting devices are connected. Said devices comprise a middle member, consisting of a screw-threaded rod $e$, which extends through bar $d$ and has two arms $e'$, $e^2$ on the end thereof next the boxes $a'$, $a^2$, said arms extending divergently, and the arm $e'$ being provided at its end with oppositely extending arc-shaped fingers $e^3$, and $e^4$, and the arm $e^2$ being provided with similar fingers $e^5$ and $e^6$. Each pair of said fingers are curved on their sides next the boxes on an arc having a shorter radius than that of the outer surface of said boxes, so that the end portions of the concave faces thus formed on said fingers may lie tangentially against the sides of the boxes, while the arms $e^2$, and the intervening portions of the fingers, are held out of contact with the boxes. Said fingers are so arranged that they may be held in simultaneous engagement with said boxes and close to the adjacent, or inner ends thereof, as shown in Figs. 1 and 5. An adjusting nut $f$ is mounted on rod $e$ between the bar $d$ and the arms $e'$, $e^2$. A pair of screw-threaded rods $g$ and $h$, also extend through the bar $d$ at opposite sides of the middle rod $e$, and are extended therefrom to provide curved or hook-shaped portions $g'$ and $h'$, respectively, the extreme end-portions of which are adapted to lie tangentially in engagement with the cylindrical sides of the boxes $a'$ and $a^2$, respectively, adjacent the outer ends of said boxes, and at opposite sides thereof from the portions engaged by the fingers of arms $e'$ $e^2$. As shown in the drawing, the relative arrangement is such that the end-portions $h'$ and $g'$, respectively, bear against the sides of the boxes $a^2$ and $a'$, approximately opposite points midway between the points of contact of the fingers $e^3$, $e^4$ and $e^5$, $e^6$ with said boxes.

As shown in Fig. 2, the end-portions $g'$, $h'$ terminate at points some distance short of points at which they would engage the standards $a^0$. The screw-threaded portions of rods $g$ and $h$ are provided with adjusting nuts $j$ and lock nuts $j'$. A pair of fingers $m$ and $n$ are also provided, which extend through the bar $d$ adjacent the ends thereof, said fingers having hook-shaped end-portions $m'$ and $n'$, respectively, which are adapted to engage the opposite sides of the standards $a^0$ from bar $d$, said end-portions $m'$, $n'$ being curved between the straight shank portions and the points where they bear against the standards, as shown in Fig. 6. It will be noted in this connection that the ends of said portions $m'$ and $n'$ both terminate short of any portion of the bearing frame against which they might engage, so that only the sides of said fingers bear against said supports. Adjusting nuts $i$ and lock nuts $i'$ are threaded on said fingers $m$ and $n$, at opposite sides of bar $d$.

A transmitting bar $o$ is provided, which may be merely a metal tube, as indicated, adapted to be slipped over the projecting end of rod $e$ and to bear against bar $d$ at one end, and to bear against a suitable wall, abutment, post or other fixed support, as $p$, adjacent the bearing.

In adjusting the parts to position, the nut $f$ on the rod $e$ is turned so as to force the end portions of the curved faces on the fingers $e^3$, $e^4$, $e^5$ and $e^6$, firmly into engagement with the sides of boxes $a'$, $a^2$, by forcing the tube $o$ firmly against the abutment $p$, through the medium of the bar $d$, the latter being preferably provided with an intermediate washer $q$ against which rod $o$ bears. The hook-shaped fingers $g$ and $h$, are then drawn, by means of their nuts $j$, in the opposite direction to that in which the middle member $e$ is forced, so that they are caused firmly to engage the opposite sides of the boxes from the bar $d$, with the result that the boxes are firmly clamped therebetween. The action of fingers $g$ and $h$ is supplemented by the fingers $m$, $n$, which are firmly clamped against the standards $a^0$ by means of their nuts $i$. All of the fingers are preferably made of stiff steel, so that they have a slight resiliency and so that their curved portions may vibrate with the parts which they engage.

When the shaft is rotated and the boxes in which it is journaled are thereby caused to vibrate, the vibrations thereof will be received by the engaging fingers above described. As to whether these vibrations are wholly transmitted from the fingers through the bar $d$ and tube $o$ to the abutment $p$, where they are absorbed, or whether the vibrations are partly absorbed by the vibratile curved end-portions of the fingers, I am unable to state with certainty, although, it is presumed that the vibrations are absorbed or reduced as they travel from the engaging end of the fingers to the abutment. However, without a vibration receiving connection between said fingers and some fixed support, as the abutment $p$, the mere clamping of the fingers against the boxes would be ineffective. It will be noted that none of the vibration-receiving fingers are actually fastened to the boxes, in the sense of being bolted, or otherwise directly connected thereto by means which are rigidly mounted in or on the boxes, or their supports, but that they are merely pressed, somewhat yieldingly, against the boxes by means which are entirely independent thereof and of their supports. The loose connection thus provided, enables the fingers to receive and transmit, or neutralize, the vibrations in a manner which would not be possible if they were rigidly connected or fastened to the journal boxes or their supports, so that no relative movement between the parts engaged and the fingers would be possible. With this arrangement the boxes will be firmly held between oppositely acting vibration-receiving fingers, and, as the fingers are arranged to engage opposite ends of the boxes, the vibrations of said boxes throughout their entire length will be absorbed or reduced to the best advantage.

As only the sides of the fingers are pressed against the boxes, or their standards, they do not, in any instance, receive any impulses or vibrations longitudinally thereof, but only transversely, the vibrations transmitted thereby being therefore, almost wholly, if not wholly, undulatory. However, any impulse longitudinally of the member $e$ will be directly received by the tube $o$ and thus absorbed by the abutment $p$.

When the support on which the bearing is mounted is directly beneath it, as shown, the boxes tend principally to vibrate horizontally, so that to enable the engaging fingers to operate to the best advantage, they are arranged to press against the boxes in an approximately horizontal direction.

Having thus described my invention, what I claim as new and desire to secure by Letters Patent is:—

1. In combination with a journal box, an independent abutment and a vibratile finger having the free end thereof pressed into loose engagement with said box by said abutment, substantially as described.

2. In combination with a journal box, a vibratile finger, and supporting means, independent of said box, for holding one side of said finger at its free end against the side of said box, substantially as described.

3. In combination with a journal box, an independent abutment, a vibratile finger, clamping means, independent of said box, for pressing one side of said finger, at its free end, against the side of the box, and vibration receiving connections between said clamping means and said abutment, substantially as described.

4. In combination with a journal box, a pair of vibratile fingers, means, independent of said box, for pressing said fingers into loose engagement with opposite sides of the box, and means for receiving the vibrations imparted to said fingers, substantially as described.

5. In combination with a journal box, a fixed abutment, a pair of vibratile fingers, clamping means, for pressing the free end-portions of said fingers against the sides of said box in opposite directions, and transversely of said fingers, and vibration-receiving connections between said clamping means and said abutment, substantially as described.

6. In combination with a journal box and its support, an independent abutment, a pair of independent, vibratile fingers, a holding device, means engaging said holding device for pressing the sides of said fingers in opposite directions against the sides of said box, and vibration-receiving means engaging said holding device and said abutment, substantially as described.

7. In combination with a journal box and its support, a finger of resilient material, and an independent abutment for pressing the free end of said finger against the side of said box, substantially as described.

8. In combination with a journal box, an independent abutment, a resilient finger havig a curved end-portion, clamping means, engaging said finger and said abutment, for pressing one side of said curved portion, adjacent its free end, against the side of the box, and vibration-receiving connections between said clamping means and said abutment, substantially as described.

9. In combination with a journal box, a pair of vibration-receiving fingers, means for holding said fingers against opposite sides of said box at different longitudinal points therein, and an independent abutment disposed to receive the vibrations of said fingers, substantially as described.

10. In combination with a journal box, an independent holder, a pair of vibration-receiving fingers mounted in said holder, and disposed to engage opposite sides of the box, one of said fingers being constructed for adjustment with relation to said holder to clamp said fingers against opposite sides of the box, and means for absorbing the vibrations transmitted to said holder, substantially as described.

11. In combination with a base having a pair of axially arranged journal boxes mounted thereon, a pair of vibration-receiving fingers disposed to engage the adjacent end-portions of said boxes at one side thereof, a pair of vibration-receiving rods disposed to engage the opposite end-portions of said boxes at the opposite side thereof, a holder, to which said fingers and rods are connected, means whereby said fingers may be adjusted in one direction and said rods in the other to clamp the boxes therebetween, and means for receiving vibrations transmitted to said holder, substantially as described.

12. In combination with a journal box, a rod having a pair of oppositely extending fingers at its end, said fingers having side faces adjacent their ends disposed to engage the sides of the box and an independent abutment for holding said faces against the box, substantially as described.

13. In combination with a pair of axially arranged journal boxes, a rod having a pair of arms at one end, a pair of oppositely extending fingers carried by each arm, said fingers having side faces, the faces of each pair of fingers being respectively disposed to be held in engagement with said boxes, simultaneously, and vibration-receiving means for holding said rod in position, substantially as described.

14. In combination with a journal, a base on which said box is mounted, a vibratile finger having means, independent of said box for pressing one side of the free end of said finger horizontally against one side of the box, and means for receiving the vibrations imparted to said finger, substantially as described.

15. In combination with a journal box, a base on which said box is mounted, a pair of vibratile fingers, means independent of said box for pressing said fingers at their free ends horizontally and in opposite directions against opposite sides of the box, and means for receiving vibrations imparted to said fingers, substantially as described.

16. In combination with a journal box and its supporting means, a pair of resilient fingers, means, independent of said box and its support, for holding the sides of said fingers, adjacent their free ends against opposite sides of said box for pressing them in opposite directions, and means for receiving vibrations imparted to said fingers, substantially as described.

In testimony whereof, I have signed my name to this specification, in the presence of two subscribing witnesses.

LOUIS N. GOOLEY.

Witnesses:
L. H. HARRIMAN,
H. B. DAVIS.